United States Patent
Kawabe

(10) Patent No.: US 7,307,928 B2
(45) Date of Patent: Dec. 11, 2007

(54) OPTICAL STORAGE DEVICE, OPTICAL DEVICE AND SERVO CONTROLLING METHOD THEREFOR HAVING FIRST AND SECOND FOCUS ERROR SIGNAL DETECTORS WITH DIFFERENT DETECTION RANGES AND TARGET TRAJECTORY GENERATOR

(75) Inventor: Takayuki Kawabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 273 days.

(21) Appl. No.: 10/972,614

(22) Filed: Oct. 25, 2004

(65) Prior Publication Data
US 2005/0058032 A1 Mar. 17, 2005

Related U.S. Application Data

(63) Continuation of application No. PCT/JP02/08273, filed on Aug. 14, 2002.

(51) Int. Cl.
G11B 7/09 (2006.01)
(52) U.S. Cl. .................... 369/44.29; 369/44.35
(58) Field of Classification Search ............... None
See application file for complete search history.

(56) References Cited

U.S. PATENT DOCUMENTS 5,740,138 A * 4/1998 Hoshino et al. ......... 369/44.29
5,864,526 A    1/1999 Le Carvennec
6,940,788 B2 * 9/2005 Hirashima ............... 369/44.29
7,016,269 B2 * 3/2006 Ogasawara et al. ...... 369/44.25

FOREIGN PATENT DOCUMENTS

| | | |
|---|---|---|
| DE | 696 28 133 | 3/2004 |
| EP | 0 910 073 | 4/1999 |
| JP | 61-42743 | 3/1986 |
| JP | 7-006372 | 1/1995 |
| JP | 7-287850 | 10/1995 |
| JP | 10-500524 | 1/1998 |
| JP | 11-120569 | 4/1999 |
| JP | 2000-322748 | 11/2000 |
| JP | 2002-298390 | 10/2002 |
| WO | WO 96/28815 | 9/1996 |

* cited by examiner

Primary Examiner—Andrea Wellington
Assistant Examiner—Michael V Battaglia
(74) Attorney, Agent, or Firm—Greer, Burns & Crain, Ltd

(57) ABSTRACT

The present invention realizes stable focus entry control even in the case where a wideband focus error signal is used with which the focus error signal sensitivity and the level in the vicinity of a focus point vary depending on a light path length. A second focus error signal having a wide range is used, causing an objective lens to approach a disk while maintaining a predetermined rate of change with respect to time, and, during approach, a transition to focus servo is performed by detecting the focus position according to the first focus error signal.

9 Claims, 18 Drawing Sheets

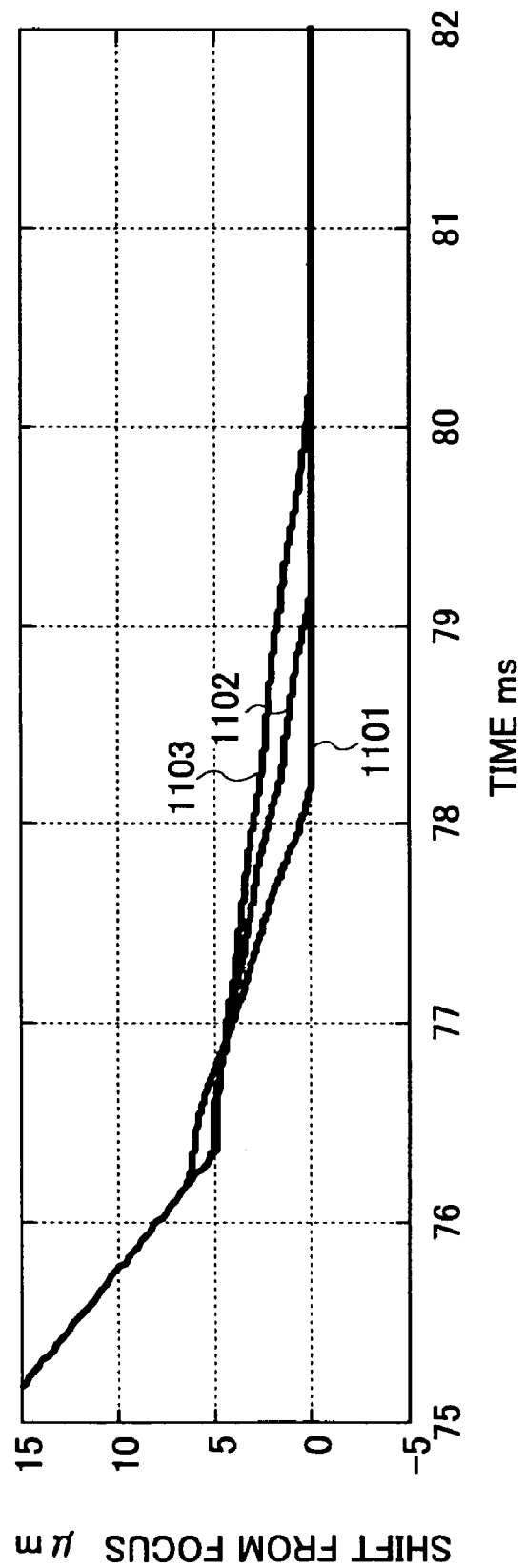

OPTICAL STORAGE DEVICE, OPTICAL DEVICE AND SERVO CONTROLLING METHOD THEREFOR HAVING FIRST AND SECOND FOCUS ERROR SIGNAL DETECTORS WITH DIFFERENT DETECTION RANGES AND TARGET TRAJECTORY GENERATOR

CROSS-REFERENCE TO RELATED APPLICATION

This application is a U.S. continuation application, filed under 35 USC 111(a) and claiming the benefit under 35 USC 120 and 365(c), of PCT application PCT/JP02/08273, filed Aug. 14, 2002. The foregoing application is hereby incorporated herein by reference.

BACKGROUND OF THE INVENTION

1. Field of the Invention

The present invention relates to optical storage devices and servo control methods thereof and, more particularly, to an optical storage device and a servo control method that oscillate a lens with respect to an object.

2. Description of the Related Art

In optical storage devices such as a disk device, in order to perform accurate recording/reproducing, focus servo control is performed such that a laser beam is focused on a recording film surface of a disk. In the focus servo control, by feeding back a focus error signal, an objective lens is controlled such that the distance between the objective lens and the disk is maintained to be constant. Recently, with the increase in recording density, the diameter of a laser beam spot is reduced. Thereby, the distance between a disk and an objective lens is reduced. In addition, the focus error signal, which is a linear error signal representing an axial relative position of an objective lens with respect to a disk, functions in the range of ±1 µm or less, which is a very narrow range. Conventionally, in order to orient an objective lens within the range in which feed back control is possible, the signal level of the focus error signal, so-called S curve, has been detected while oscillating the objective lens by open-loop control. In addition, focus entry control has been used in which a focus control loop is closed after it is detected that the position of the objective lens falls within a linear range so as to perform focus control by close-loop control.

FIG. 1 is a block diagram of a disk device. FIGS. 2A, 2B and 2C show conceptual diagrams of a separate optical system and positional relationships between a fixed head and a movable head.

In FIG. 1, a disk device 1 is mainly formed by a control unit 2 and a disk enclosure 3.

The control unit 2 includes a higher interface 11, a buffer memory 12, a MPU 13, an optical disk controller 14, a read/write LSI 15, a DSP 16, a focus error signal (FES) detection circuit 17, a track error signal (TES) detection circuit 18, a zero-cross detection circuit 19, and drivers 20 through 23. In addition, the enclosure 3 includes a laser diode unit (LDU) 31, a detector 32 for ID/MO signal detection, a head amp 33, a spindle motor 34, a magnetic field application part 35, a detector 36a for focus error detection, a detector 36b for track error detection, a lens actuator 37, and a voice coil motor 38.

The separate optical system of FIGS. 2A, 2B and 2C includes a fixed head 201, a movable head 202, a base 203, and a guide rail 204. Additionally, the spindle motor 34 is mounted to the base 203, and a disk 206 is mounted to the spindle motor 34. The movable head 202 includes a movable head carriage 210, a mirror 211, a lens holder 212, an objective lens 213, a focus coil 214 that moves the objective lens in a direction perpendicular to a surface of the disk 206, and a leaf spring 215. Light emitted from the laser diode unit 31 shown in FIG. 1 is guided to the movable head 202 via the fixed head 201. The light reflected by the mirror 211 in the movable head 202 is directed to the disk 206 and focused on the disk 206 via the objective lens 213.

The higher interface 11 performs interfacing with a higher apparatus. Data transmitted to/received from the higher apparatus are temporarily stored in the buffer memory 12. The operation of the device 1 is controlled by the MPU 13 and the disk controller 14.

The read/write LSI 15 performs modulation/demodulation of data. When writing data on a disk, the read/write LSI 15 modulates and supplies write data to the laser diode unit 31, and when reading data from a disk, the read/write LSI 15 controls the laser diode unit 31 such that light for reading is emitted from the laser diode unit 31.

The light emitted from the laser diode unit 31 to the disk 206 via the fixed head 201 shown in FIGS. 2A, 2B and 2C and the movable head 202 is reflected by the disk 206, returned to the fixed head 201 via the movable head 202 shown in FIGS. 2A, 2B and 2C, and supplied to the detector 32 for ID/MO signal detection, the detector 36a for focus error detection, and the detector 36b for track error detection in the fixed head. The detector 32 for ID/MO signal detection detects an ID/MO signal component from the reflected light from the disk 206, and supplies the detected ID/MO signal to the head amp 33. The head amp 33 amplifies and supplies the ID/MO signal to the read/write LSI 15. The read/write LSI 15 demodulates an ID and data from the ID/MO signal. The data demodulated in the read/write LSI 15 are stored in the buffer memory 12.

The detector 36a for focus error detection converts incident light into an electronic signal and supplies it to the focus error signal detection circuit 17. The focus error signal detection circuit 17 generates a focus error signal based on the electronic signal from the detector 36a for focus error detection.

The focus error signal generated in the focus error signal detection circuit 17 is supplied to the DSP 16. The DSP 16 generates and supplies to the driver 22 a focus control signal based on the focus error signal generated in the focus error signal detection circuit 17. Based on the focus control signal from the DSP 16, the driver 22 supplies a driving current to the actuator 37. Based on the driving current from the driver 22, the lens actuator 37 moves the objective lens shown in FIGS. 2A, 2B and 2C in a focus direction, that is, a direction perpendicular to a surface of the disk 206. By moving the objective lens of FIGS. 2A, 2B and 2C in the focus direction, the laser light emitted from the laser diode unit 31 is focused on the disk 206.

In addition, the detector 36b for track error detection converts incident light into an electronic signal and supplies it to the track error signal detection circuit 18. The track error signal detection circuit 18 generates a track error signal based on the signal detected in the detector 36b for track error detection. The track error signal detected in the track error signal detection circuit 18 is supplied to the DSP 16 and the track zero-cross signal detection circuit 19. The track zero-cross signal detection circuit 19 generates and supplies to the DSP 16 a track zero-cross signal based on the track error signal. Based on the track error signal and the track zero-cross signal, the DSP 16 generates and supplies a tracking control signal to the driver 23.

The driver 23 supplies a driving current to the voice coil motor 38 based on the tracking control signal from the DSP 16. The voice coil motor 38 is driven based on the driving current from the driver 23, and moves the movable head 202 in a radial direction of the disk 206 to perform a track following operation.

Further, the MPU 13 generates and supplies a spindle motor control signal to the driver 20. Based on the spindle motor control signal from the MPU 13, the driver 20 rotates the spindle motor 34.

Furthermore, the MPU 13 generates and supplies a magnetic field control signal to the driver 21. Based on the magnetic field control signal from the MPU 13, the driver 21 supplies a driving current to the magnetic field application part 35. The magnetic field application part 35 produces a bias magnetic field corresponding to the driving current from the driver 21. The bias magnetic field produced by the magnetic field application part 35 is applied to the disk 206 and used for recording and/or reproduction of information.

Next, a detailed description is given of the operation of conventional focus entry control.

In an objective lens oscillating operation in the focus entry control, an objective lens is oscillated such that the objective lens surely passes a focus position. In a case where focus entry fails in the oscillating operation, there is a possibility that the objective lens may contact a disk. Thus, in order to prevent this, there is a method of providing a stopper between the disk and the objective lens so as to physically limit displacement of the objective lens. According to the method, even in the case where focus entry fails, the objective lens does not contact the disk, and thus it is possible to prevent data from being damaged.

However, when the focus distance becomes short, in a state where the laser light beam is focused on the disk, the distance between the objective lens and the disk becomes several dozen μm or less. Considering that vertical run-out of a disk due to rotation is several dozen to several hundred μm, it is impossible to provide a stopper for avoiding collision between the objective lens and the disk. Accordingly, in order to avoid collision between the objective lens and the disk, it is necessary to more positively perform focus entry control.

In order to positively perform focus entry control, it is necessary to control the overshoot amount of a focus servo control system after closed-loop control is started by closing the focus servo control system such that the focus error signal falls within a substantially linear range. In order to do so, it is necessary to suppress an error in the relative positions and the relative speeds of the objective lens and the disk immediately before starting closed-loop control by closing the focus servo control system.

However, in the conventional method where focus entry is performed by an oscillation operation of an objective lens, it is impossible to find a relative state between a disk and the objective lens until the S curve of the focus error signal is detected. In a case where, for example, the vertical run-out is ±100 μm in a disk rotated at 1500 rpm, the amplitude of vertical acceleration is ±15.7 mm/s. In order to perform focus entry based on detection of the S curve of the focus error signal, it is necessary to maintain the relative speed to a positive value in an approaching direction. Accordingly, when the objective lens is made to approach the disk at ±16 mm/s, the relative speed with respect to the disk varies in the range of 0.3–31.7 mm/s. Hence, in the case where the maximum value of the relative speed is 31.7 mm/s depending on the timing of vertical run-out of the disk, only 7.89 μs is required to pass the range where the focal depth is 0.25 μm. It is very difficult to perform focus servo control by a DSP whose sampling time for the focus error signal is 10 μs.

Accordingly, in order to realize stable focus entry control, it is necessary to control the relative speed between the disk and the objective lens. In order to do so, a sensor is required that outputs a position signal whose range of focus error detection is wider than that of the focus error signal. For example, in an embodiment shown in Japanese Laid-Open Patent Application No. 11-120569, having the title of the invention "Device and Method for Recording/Reproducing Optical Disk", a position detection sensor for an objective lens is provided above a focusing actuator of the objective lens. The relative position with respect to a disk is detected by the position detection sensor for the objective lens, thereby aiming to realize stable focus entry. In this embodiment, however, it is necessary to mount the sensor to the actuator, which adversely affects reduction of the size and weight of the actuator.

Additionally, in an embodiment shown in Japanese Laid-Open Patent Application No. 7-287850, having the title of the invention "Optical Pickup Device and Focusing Control Method Thereof", reflected light from a medium is divided into two beams of light: one is incident on a detection optical system having a low sensitivity to focus error detection and is used for a drawing operation; and the other is incident on a detection optical system having a high sensitivity for focus error detection and is used for focus servo control. According to the method, it is unnecessary to provide a sensor to a movable part. Thus, there is an advantage in that the size of an actuator can be reduced.

Further, the embodiment is characterized in that the direction in which a focus exists is detected by a first detection optical system having a low sensitivity from a position relatively distant from the focus, and an objective lens is moved in the correct direction. There is no description about a method for stably transit to focus servo by a second detection optical system having a high sensitivity. Thus, in an apparatus where the distance between the objective lens and a disk is very narrow, there is a risk the lens and the disk may collide with each other.

Hence, as for a method for outputting a focus error signal having a wide detection range for focus error by improving a conventional photodetector for servo, there is an embodiment shown in Japanese Patent Application No. 2001-93091, having the title of the invention "Optical Device for Recording and Reproducing Information". With the use of the method, it is possible to detect the relative displacement between an objective lens and a disk from a position distant from a focus position by several dozen μm. Hence, it is possible to perform controlled movement of the objective lens to a focus position at a desired relative speed.

Next, a further detailed description is given of a focus error signal detection method described in Japanese Patent Application No. 2001-93091, with reference to FIGS. 3, 4 and 5.

FIG. 3 is a diagram showing the structure of the fixed optical head 201 shown in FIGS. 2A, 2B and 2C. FIG. 4 is a block diagram of a first focus error signal detection circuit. FIG. 5 is a block diagram of a track error signal and a second focus error signal detection circuit.

The fixed optical head of FIG. 3 is formed by a laser diode 301, a collimate lens 302, beam splitters 303, 304 and 307, a Wollaston prism 305, condenser lenses 306, 308 and 310, a Foucault prism 309, a divided-by-two detector 32, a divided-by-six detector 36, and a divided-by-four detector 36a.

The laser light emitted from the laser diode 301 is emitted from the fixed head 201 of FIGS. 2A, 2B and 2C via the collimate lens 302 and the beam splitter 303, guided to the movable head 202, and directed onto the optical disk 206. The returning light reflected by the optical disk 206 is reflected by the beam splitter 303 and guided to the beam splitter 304. The beam splitter 304 splits the incident light into two light beams and guides the respective light beams to the Wollaston prism 305 and the beam splitter 307. The light incident on the Wollaston prism 305 is focused on the divided-by-two detector 32 via the condenser lens 306, and the ID/MO signal is detected.

On the other hand, the light guided to the beam splitter 307 is divided into two light beams by the beam splitter 307 and the beam splitter 307 guides the respective light beams to the condenser lens 308 and the Foucault prism 309. The light guided to the condenser lens 308 is focused on the divided-by-six detector 36b. The light guided to the Foucault prism 309 is focused on the divided-by-four detector 36a via the condenser lens 310.

FIG. 4 is a block diagram of the first focus error signal detection circuit 17, which is formed mainly by a current-to-voltage (I-V) conversion circuit 401, a first focus error signal (FE1) operation circuit 402, a focus sum (FS) operation circuit 403, and an automatic gain control (AGC) circuit 404. The divided-by-four detector 36a is formed by four detectors F, G, H and I.

According to the Foucault method, each output current of each of the detectors F, G, H and I of the divided-by-four detector 36a, which output current is produced from the returning light focused on the divided-by-four detector 36a, is converted into a voltage signal by the current-to-voltage (I-V) conversion circuit 401. Then, the first focus error signal (FE1) operation circuit 402 subtracts the sum signal of the voltage signals with respect to the detectors G and H from the sum signal of the voltage signals with respect to the detectors F and I, and outputs the resulting difference. On the other hand, the focus sum (FS) operation circuit 403 outputs the sum signal of the voltage signals with respect to the detectors F, G, H and I. Then, the automatic gain control (AGC) circuit 404 divides the output of the first focus error signal (FE1) operation circuit 402 by the output of the focus sum (FS) operation circuit 403 to detect a focus error signal, which is used for normal focus servo.

FIG. 5 is a block diagram of the track error signal and the second focus error signal detection circuit, which is formed by a current-to-voltage (I-V) conversion circuit 501, a track error (TE) operation circuit 502, a second focus error signal (FE2) operation circuit 503, a track sum (TS) operation circuit 504, and automatic gain control (AGC) circuits 505 and 506. The divided-by-six detector 36b is divided into three in the direction orthogonal to a divided-by-two detector for tracking error signal detection according to a conventional push-pull method, and is formed by detectors A1, A2, B1, B2, C1 and C2.

Each output current of each of the detectors A1, A2, B1, B2, C1 and C2 of the divided-by-six detector 36b, which output current is produced from the returning light focused on the divided-by-six detector 36b, is converted into a voltage signal by the current-to-voltage (I-V) conversion circuit 501. The current-to-voltage (I-V) conversion circuit 501 outputs: a voltage signal A (=A1+A2) obtained by converting the output currents of the detectors A1 and A2 into voltages and adding them together; a voltage signal B (=B1+B2) obtained by converting the output currents of the detectors B1 and B2 into voltages and adding them together; a voltage signal C (=C1+C2) obtained by converting the output currents of the detectors C1 and C2 into voltages and adding them together; a voltage signal D (=A1+B1+C1) obtained by converting the output currents of the detectors A1, B1 and C1 into voltages and adding them together; and a voltage signal E (=A2 +B2 +C2) obtained by converting the output currents of the detectors A2, B2 and C2 into voltages and adding them together.

The track error signal (TE) operation circuit 502 calculates a (D−E) signal and outputs a track error signal. The second focus error signal (FE2) operation circuit 503 calculates a (A+B−C) signal, and a focus error signal according to the spot size detection method (hereinafter referred to as the SSD method) is output. A focus error signal according to the SSD method can obtain a second focus error signal having a wider detection area compared to a focus error signal according to the conventional Foucault method, and is suitable for the case where focus control is performed from a position distant from a focus position. Then, the track sum (TS) operation circuit 504 outputs a (D+E) signal.

Then, the automatic gain control (AGC) circuit 505 performs automatic gain control by dividing the track error signal output (D−E) by the sum signal (D+E). In addition, the automatic gain control (AGC) circuit 506 performs automatic gain control by dividing the second focus error signal (A+B−C) by the sum signal (D+E).

FIG. 6A shows an example of the first focus error signal according to the Foucault method, and FIG. 6B shows an example of the second focus error signal according to the SSD method. While the use range of the first focus error signal of FIG. 6A is ±0.25 μm, the second focus error signal of FIG. 6B can be used in the range of −5 to +20 μm.

FIG. 7 shows an operating waveform of focus entry control using the second focus error signal. In FIG. 7, the vertical axis represents the distance between a focus position and an objective lens, and the horizontal axis represents time.

In this embodiment, the objective lens is made to approach a disk by open-loop control in a zone 710, up to the position that is distant from the focus position by 10 μm. Then, when the position of the objective lens is within 10 μm from the focus position, position feedback control according to the second focus error signal is performed. A broken line 701 indicates a control target position signal, and a continuous line 702 indicates the operation of the position feedback control according to the second focus error signal. By approximating the target position signal 701 to zero over time, the position of the objective lens is made close to the focus position by the position feedback control according to the second focus error signal. When the target position signal 701 reaches zero, the input of the position feedback control is switched from the second focus error signal to the first focus error signal. A continuous line 703 indicates the operation of the position feedback control according to the first focus error signal. In the aforementioned manner, it is possible to make the relative position and relative speed of the objective lens with respect to the focus position at the time of switching the first focus error signal to be zero, and thus it is possible to realize stable focus entry control.

However, in the second focus error signal detection according to the SSD method, when the movable head 202 shown in FIGS. 2A, 2B and 2C moves and the total light path length varies, error signal sensitivity and signal level vary. Thus, there is a problem in that the distance from the focus and the signal sensitivity depend on the total light path length.

FIG. 8 shows the characteristics of the second focus error signal at the time when the movable head 202 shown in FIG.

2B is moved by +20 μm (FIG. 2A) and −20 μm (FIG. 2C) and the light path length from the fixed head is changed by 40 mm. In FIG. 8, a line 801 indicates the characteristics of the second focus error signal in the case where the movable head 202 is at the position of FIG. 2A (+20 μm), a line 802 indicates the characteristics of the second focus error signal in the case where the movable head 202 is at the position of FIG. 2B (0 μm), and a line 803 indicates the characteristics of the second focus error signal in the case where the movable head 202 is at the position of FIG. 2C (−20 μm).

Under such characteristics, in the case where the movable head 202 is at the position of FIG. 2B, by switching to the first focus error signal at the time when the level of the second focus error signal becomes zero, it is possible to make the relative position and the relative speed of the objective lens with respect to the focus position at the time of switching the first focus error signal to be zero. Thus, it is possible to realize stable focus entry. However, in the case where, for example, the movable head is at the position of +20 mm shown in FIG. 2A, when the zero level of the second focus error signal is detected, actually, the objective lens exists at the position that is distant from the focus position by −2.5 μm. On this occasion, since the position of the objective lens is outside the linear range of the first focus error signal, it is impossible to stably switch to the first focus error signal.

FIGS. 9A, 9B and 9C show focus entry waveforms on this occasion. FIG. 9A shows the distance between the focus position and the objective lens, FIG. 9B shows the second focus error signal, and FIG. 9C shows the first focus error signal. 901, 902 and 903 of FIGS. 9A, 9B and 9C correspond to the positions of the movable head 202 of FIGS. 2A, 2B and 2C respectively. In the case of FIG. 2B where the movable head position is ±0, even if focus servo control according to the second focus error signal is switched to focus servo control according to the first focus error signal in the vicinity of the time 78.5 ms, the transition is smooth. However, in the case where, for example, FIG. 2A where the position of the movable head is +20 mm, as indicated by the lines 901 in FIGS. 9A, 9B and 9C, though the second focus error signal is zero in the vicinity of the time 78.5 ms, the actual shift of the position of the objective lens from the focus position is −2 μm. Thus, at this time point, since it is outside the linear signal detection range of the first focus error signal, large overshooting occurs at the time of transition to servo control according to the first focus error signal. The same applies to the case of FIG. 2C where the position of the movable head is −20 mm as indicated by the line 903.

In view of the above, it is an object of the present invention to provide an optical storage device and a servo control device therefor that can perform stable focus entry by smoothly performing a transition to focus servo control according to the first focus error signal even in the case where the characteristics of the second focus error signal vary due to a variation in the light path length.

SUMMARY OF THE INVENTION

It is an object of the present invention to provide an optical storage device and a servo control device therefor in which the above-mentioned problems in the prior art are eliminated.

It is another object of the present invention to realize stable focus entry control even in the case where a focus error signal is used with which the focus error signal sensitivity and the level in the vicinity of a focus point vary depending on the light path length.

In order to achieve the above-mentioned objects, the present invention uses a second focus error signal having a wide detection range, causing an objective lens to approach a disk while maintaining a predetermined rate of change with respect to time, and, during approach, a transition to focus servo is performed by detecting the focus position by using the first focus error signal.

According to the present invention, by using the second focus error signal having the wide detection range, the objective lens is caused to approach the disk while maintaining the predetermined rate of change with respect to time. Hence, it is possible to positively make the focus point to be reached while maintaining arbitrary relationships of relative distance/relative speed between the objective lens and the disk. Accordingly, when switching to focus servo according to a first accurate focus error signal, it is possible to control an initial condition to fall within a fixed range. Thus, it is possible to realize stable focus entry. Hence, even in an apparatus having a short working distance, it is possible to significantly reduce the risk of collision of the objective lens with the disk at the time of focus entry.

In addition, according to the present invention, the rate of change with respect to time of a moving objecting lens is controlled. Thus, it is possible to maintain focus entry speed within a fixed range. Accordingly, even in the case where the characteristics of the second focus error signal vary depending on the light path length, it is possible to realize stable focus entry.

BRIEF DESCRIPTION OF THE DRAWINGS

Other objects, features and advantages of the present invention will become more apparent from the following detailed description when read in conjunction with the accompanying drawings, in which:

FIG. 11A is a graph showing the time waveform representing an operation of focus entry control of the present invention;

DETAILED DESCRIPTION OF THE PREFERRED EMBODIMENTS

A description is given below of an embodiment for performing the present invention with reference to the drawings.

Figure 1:
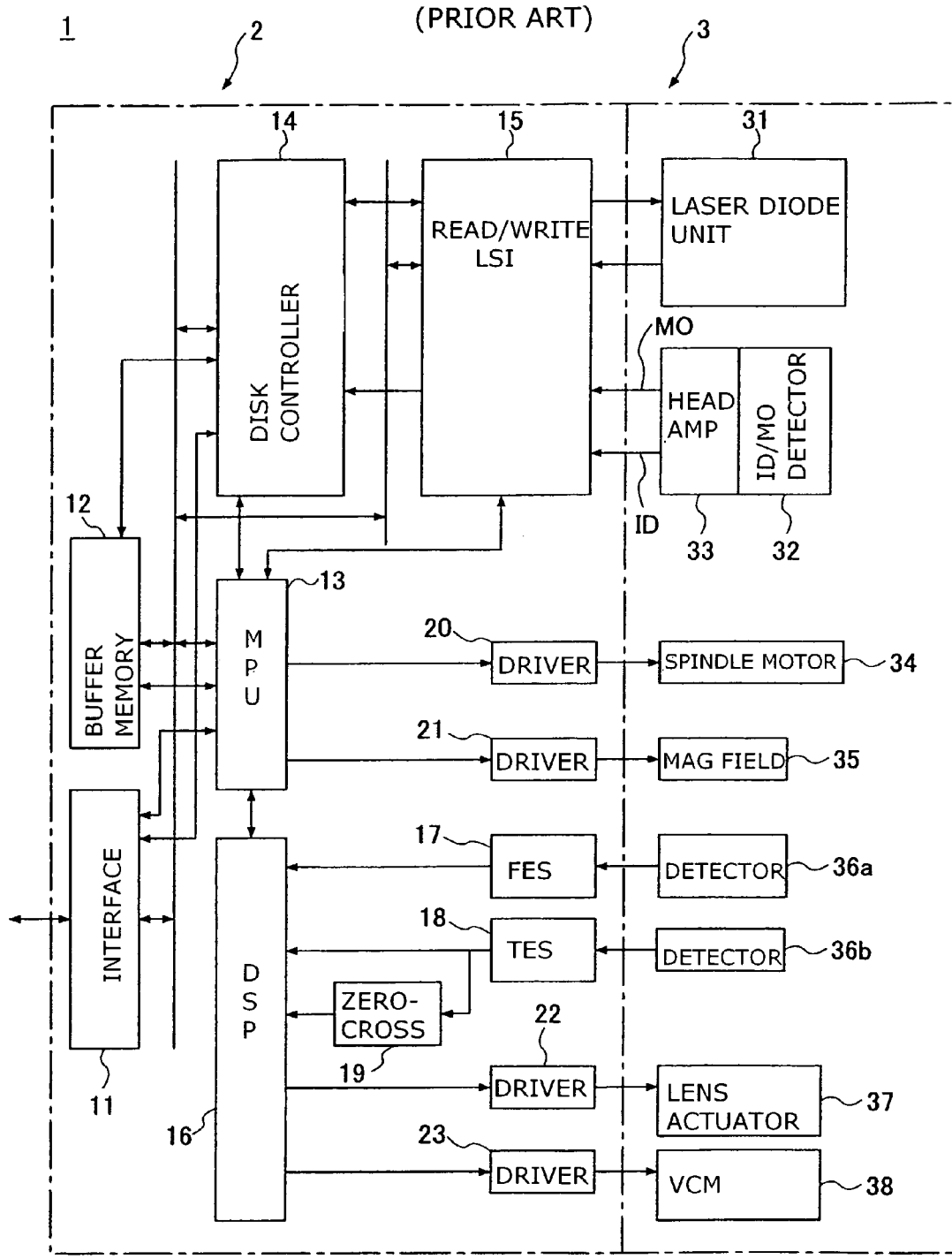
FIG. 1 is a block diagram showing a disk device.
Figure 10:
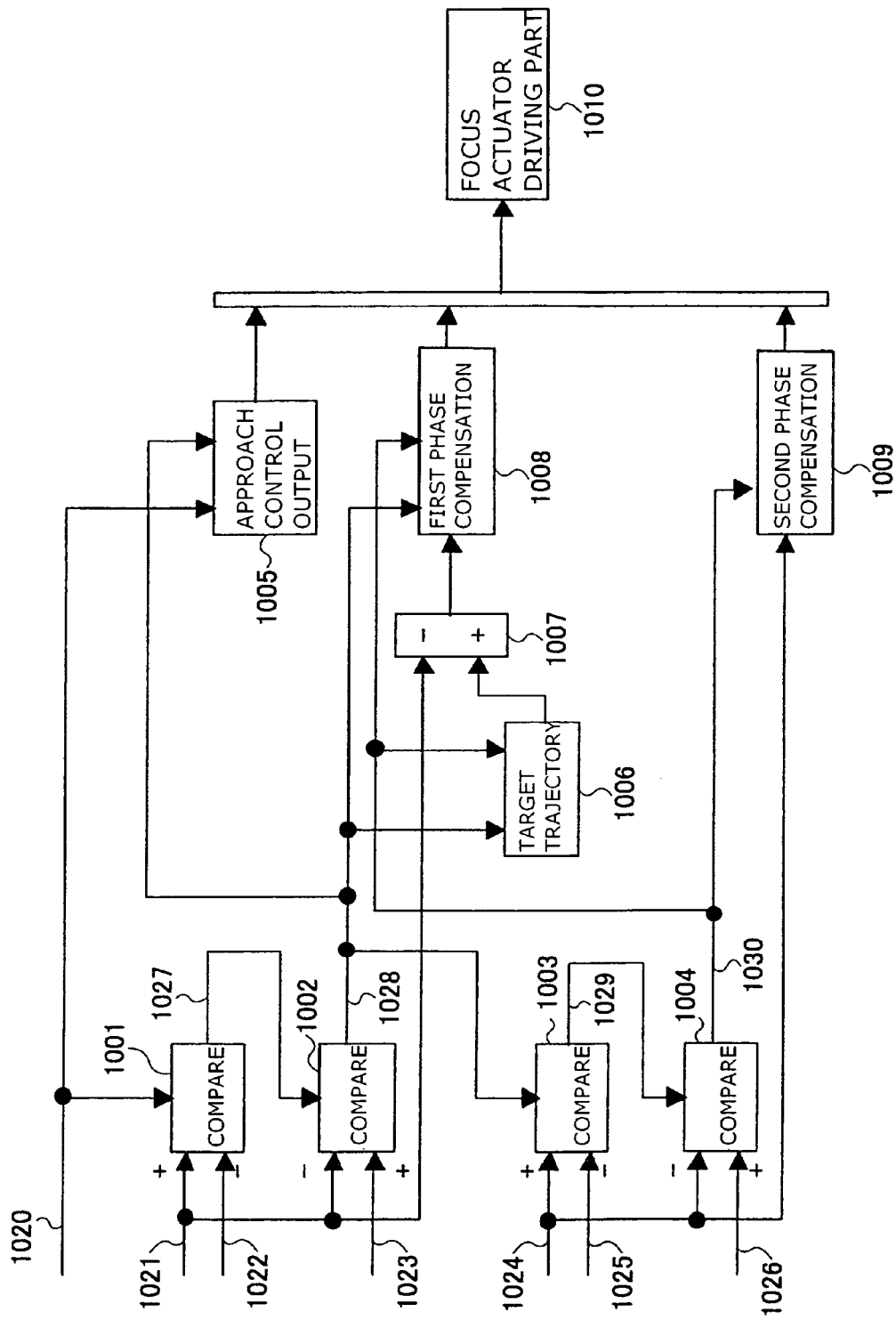
FIG. 10 is a block diagram of one embodiment of a focus entry control part according to the present invention.

FIG. 10 is a block diagram of a focus entry control part of an optical disk device. Although a description is given of the case where the focus entry control part is hardware, the focus entry control part may be realized as software that is executed in the DSP 16 of FIG. 1. The focus entry control part shown in FIG. 10 is formed mainly by comparing parts 1001, 1002, 1003 and 1004, an approach control output generation part 1005, a target trajectory generation part 1006, a subtracting part 1007, a first phase compensation part 1008, a second phase compensation part 1009, and a focus actuator driving part 1010. In addition, a focus entry control start signal 1020, a second focus error signal 1021, and a threshold value 1022 are input to the comparing part 1001. An output signal 1027 of the comparing part 1001, the second focus error signal 1021, and a threshold value 1023 are input to the comparing part 1002. An output signal 1028 of the comparing part 1002, a first focus error signal 1024, and a threshold value 1025 are input to the comparing part 1003. An output signal 1029 of the comparing part 1003, the first focus error signal 1024, and a threshold value 1026 are input to the comparing part 1004.

Upon input of the focus entry control start signal 1020, the comparing part 1001 and the approach control output generation part 1005 start operations. A signal that makes an objective lens to gradually approach a disk is output from the approach control output generation part 1005, sent to the focus actuator driving part 1010, and causes the objective lens to move in a direction in which the objective lens approaches the disk.

When the level of the second focus error signal 1021 becomes equal to or more than the threshold value 1022, the comparing part 1001 sends the output signal 1027 to the comparing part 1002, thereby starting the operation of the comparing part 1002. On this occasion, the operation of the comparing part 1001 stops.

When the level of the second focus error signal 1021 becomes equal to or less than the threshold value 1023, the comparing part 1002 operates so to start the operations of the comparing part 1003, the phase compensation part 1008, and the target trajectory generation part 1006, and stops the approach control output generation part 1005. On this occasion, the operation of the comparing part 1002 stops.

The target trajectory generation part 1006 generates a signal whose level is gradually decreased from the threshold value 1023 at a constant rate with respect to time. In addition, if the polarity of the subtracting part 1007 is reversed, a signal whose level is gradually increased at a constant rate with respect to time may be generated. Alternatively, a target trajectory signal may be generated that is continuously changed with respect to time and the rate of change is of a single polarity.

The subtracting part 1007 calculates the difference between the output signal of the target trajectory generation part 1006 and the second focus error signal 1021. Then, the difference signal between the output signal of the target trajectory generation part 1006 and the second focus error signal 1021, which is calculated by the subtracting part 1007, is input to the phase compensation part 1008. The first phase compensation part 1008 outputs the difference signal after performing phase compensation thereon so that a focus actuator control system is stabilized. The signal subjected to the phase compensation is sent to the focus actuator driving part 1010, and the position of the objective lens is controlled in the direction of approaching the disk.

When the level of the first focus error signal 1024 becomes equal to or more than the threshold value 1025, the comparing part 1003 starts the operation of the comparing part 1004. On this occasion, the operation of the comparing part 1003 stops.

When the level of the first focus error signal 1024 becomes equal to or less than the threshold value 1026, the comparing part 1004 activates the second phase compensation part 1009, and stops the first phase compensation part 1008 and the target trajectory generation part 1006. On this occasion, the operation of the comparing part 1004 stops.

The first focus error signal 1024 is input to the second phase compensation part 1009. The second phase compensation part 1009 outputs a signal whose phase is compensated such that the focus actuator control system is stabilized. The phase-compensated signal is sent to the focus actuator driving part 1010, and the position of the objective lens is controlled to maintain a focus position.

In the above-mentioned structure, it is detected by the comparing parts 1001 and 1002 that the level of the second focus error signal is equal to or less than the predetermined minimum level after detecting that the level of the second focus error signal is equal to or more than the predetermined maximum level. However, similar effects are obtained in an adverse structure in which the polarities of input terminals of the comparing parts 1001 and 1002 are reversed, and it is detected that the level of the second focus error signal is equal to or more than the predetermined maximum level after detecting that the level of the second focus error signal is equal to or less than the predetermined minimum level.

Further, in the above-mentioned structure, it is detected by the comparing parts 1003 and 1004 that the level of the first focus error signal is equal to or less than the predetermined minimum level after detecting that the level of the first focus error signal is equal to or more than the predetermined maximum level. However, similar effects are obtained in an adverse structure in which the polarities of input terminals of the comparing parts 1003 and 1004 are reversed, and it is detected that the level of the first focus error signal is equal to or more than the predetermined maximum level after detecting that the level of the first focus error signal is equal to or less than the predetermined minimum level.

Figure 11B:
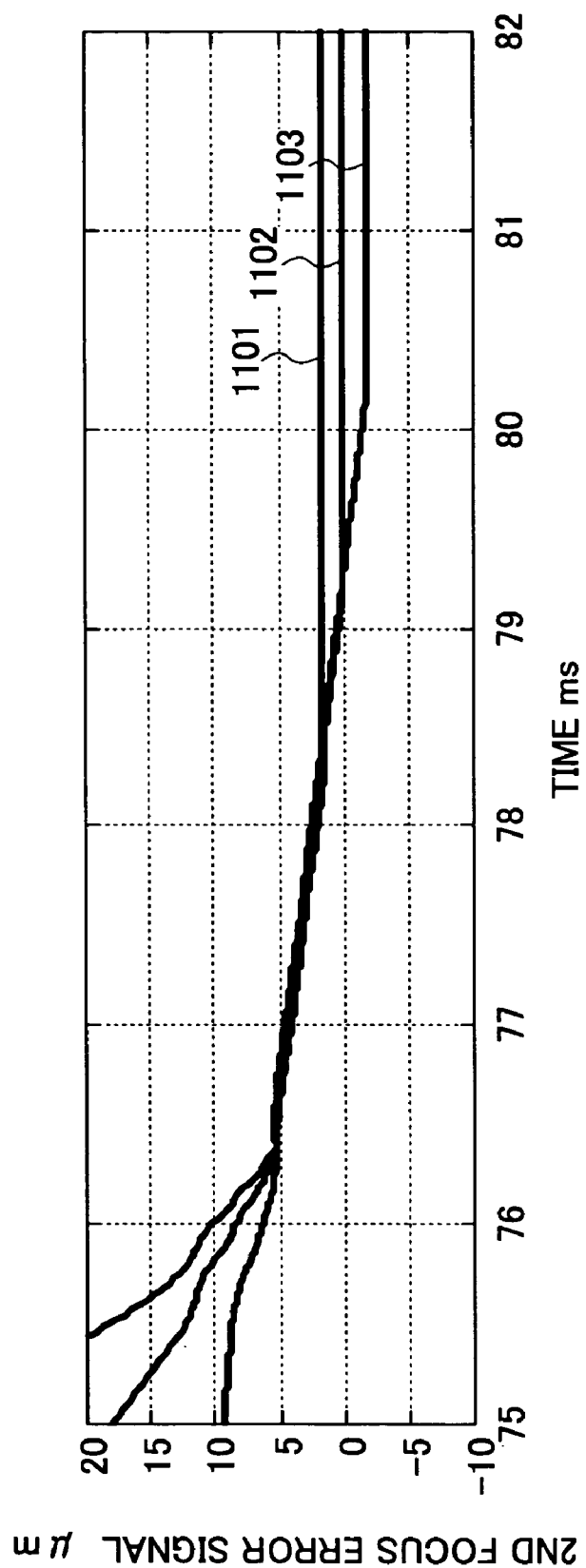
FIG. 11B is a graph showing the time waveform representing an operation of the focus entry control of the present invention.
Figure 11C:
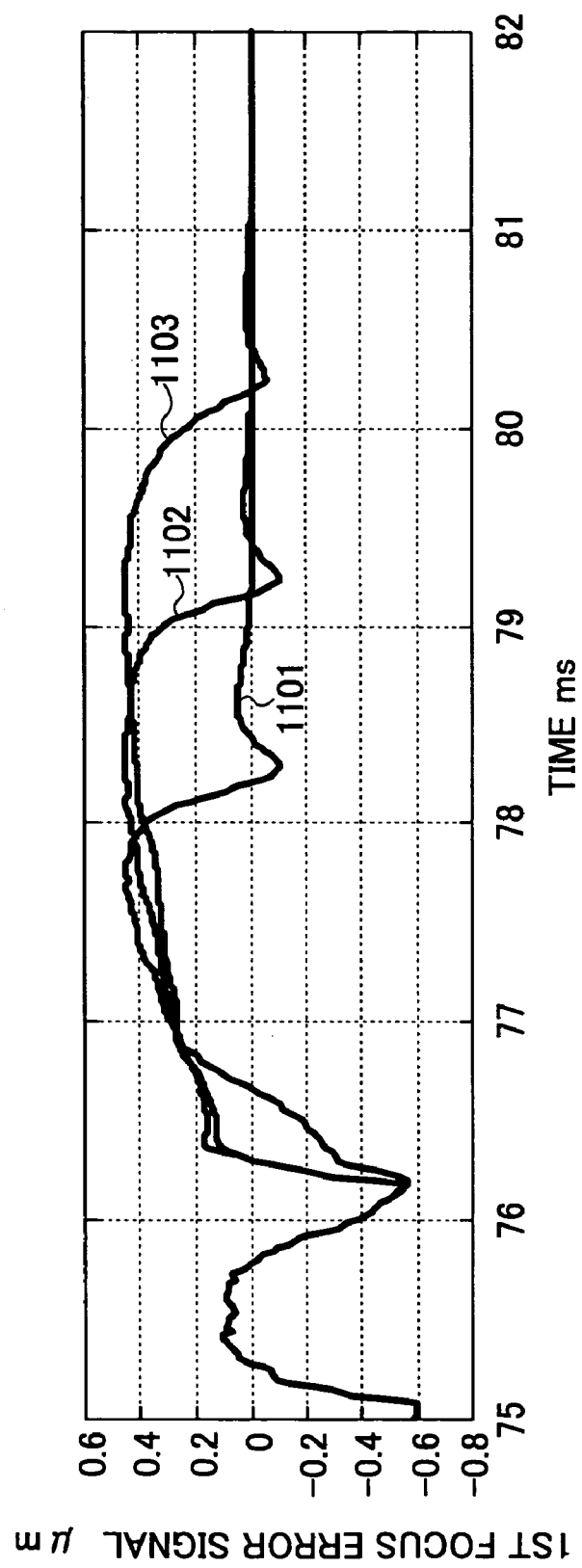
FIG. 11C is a graph showing the time waveform representing an operation of the focus entry control of the present invention.

Next, FIGS. 11A, 11B and 11C show operation signal waveforms in the case of using this embodiment.

Figure 9A:
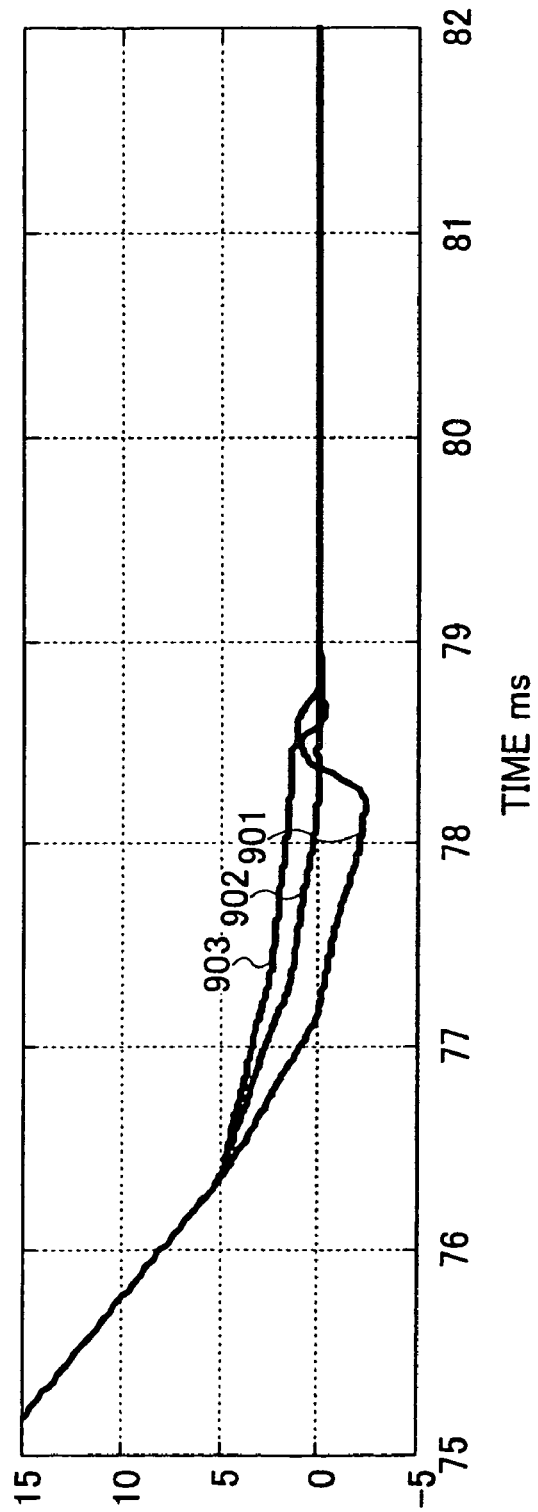
FIG. 9A is a graph showing the time waveform representing an operation according to a conventional method.
Figure 9B:
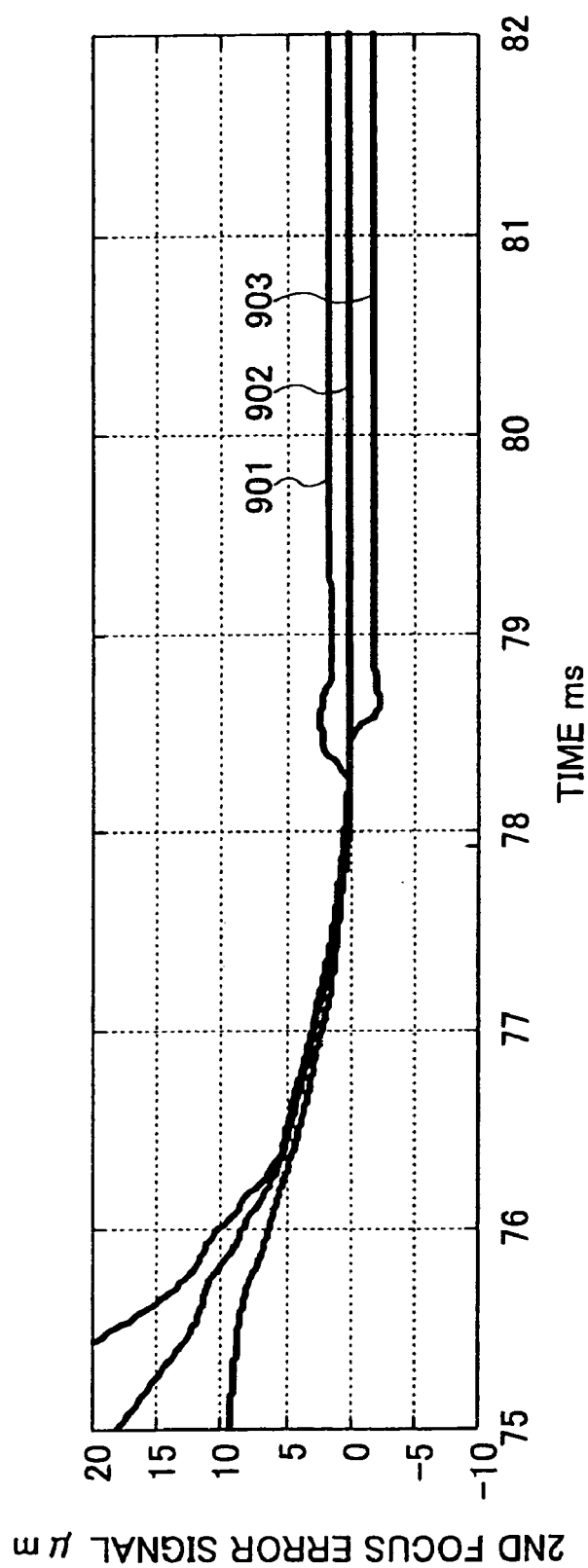
FIG. 9B is a graph showing the time waveform representing an operation according to the conventional method.
Figure 9C:
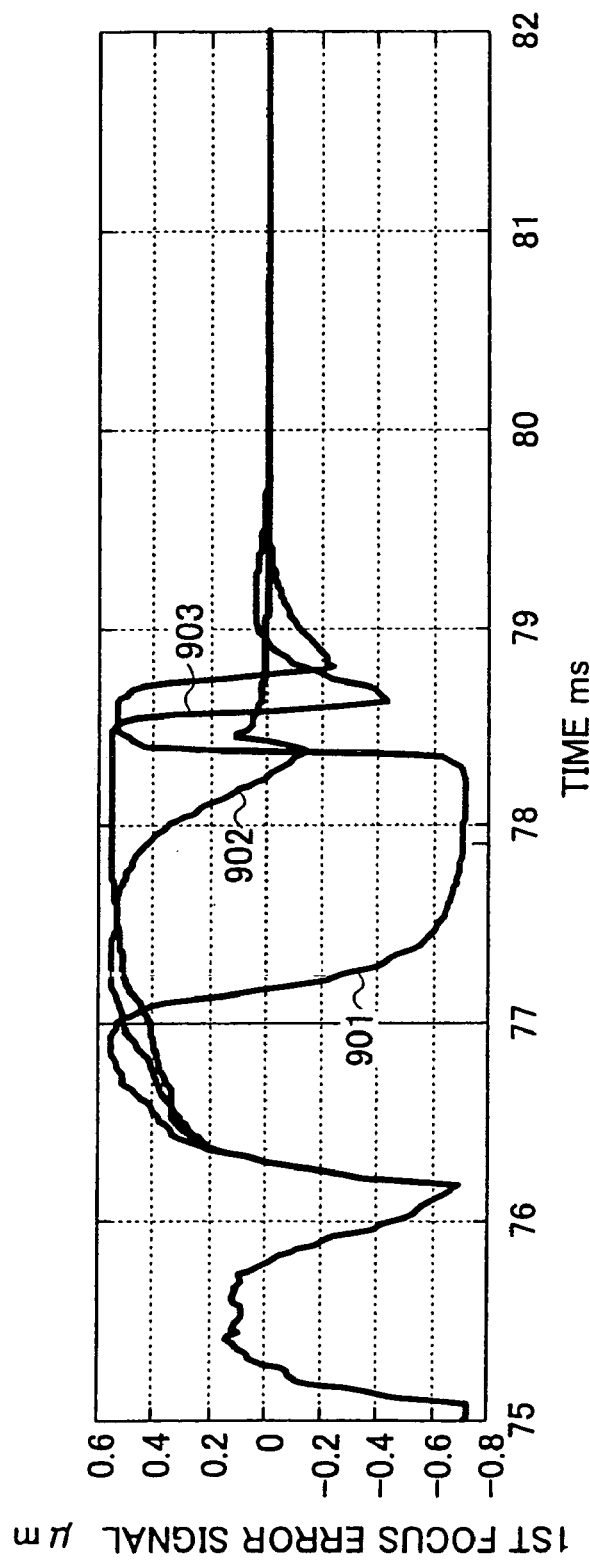
FIG. 9C is a graph showing the time waveform representing an operation according to the conventional method.

FIGS. 11A, 11B and 11C show focus entry waveforms according to the present invention. FIG. 11A shows the distance between the focus position and the objective lens, FIG. 11B shows the second focus error signal, and FIG. 11C shows the first focus error signal. 1101, 1102 and 1103 in FIGS. 11A, 11B and 11C indicate operation waveforms of the present invention corresponding to the positions of the movable head 202 of FIGS. 2A, 2B and 2C, and also corresponding to the cases of 901, 902 and 903 in FIGS. 9A, 9B and 9C, which are conventional examples.

In FIGS. 11A, 11B and 11C, up to about the time 76.2 ms, the objective lens is made to approach the disk by the signal from the approach control output generation part 1005. At this point, the level of the second focus error signal is larger than the threshold value 1022, and the comparing part 1002 is operating. In the vicinity of the time 76.2, the level of the second focus error signal 1021 becomes equal to or less than the threshold value 1023 (in this case, a level equivalent to 6 μm), and target trajectory control using the second focus error signal 1021 is being performed. Here, the comparing part 1003 monitors the level of the first focus error signal 1023, and upon detection that the level of the first focus error signal 1024 is equal to or more than the threshold value 1025 (in this case, a level equivalent to 0.4 μm), switching is made to monitoring by the comparing part 1004.

When it is detected by the comparing part 1004 that the level of the first focus error signal 1024 becomes equal to or less than the threshold value 1026 (in this case, a level equivalent to 0.1 μm), focus servo control using the first focus error signal 1024 is being performed.

Figure 2A:
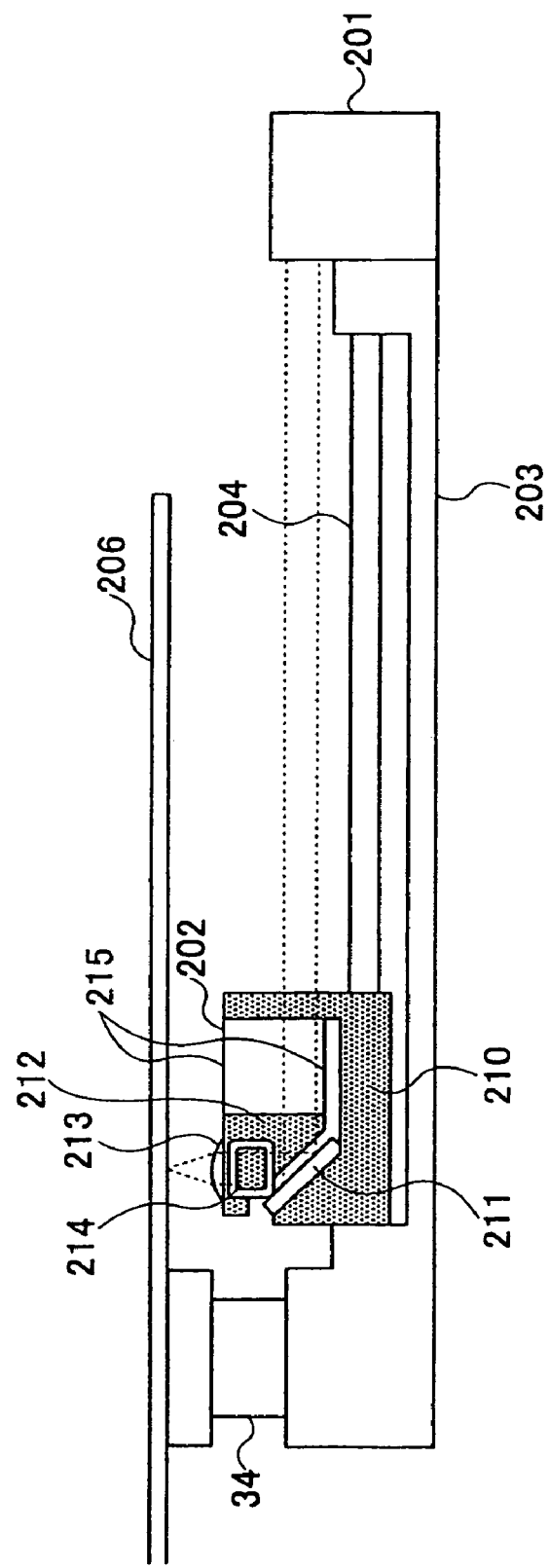
FIG. 2A is a diagram showing the concept of a separate optical system and the positional relationship between a fixed head and a movable head.
Figure 2B:
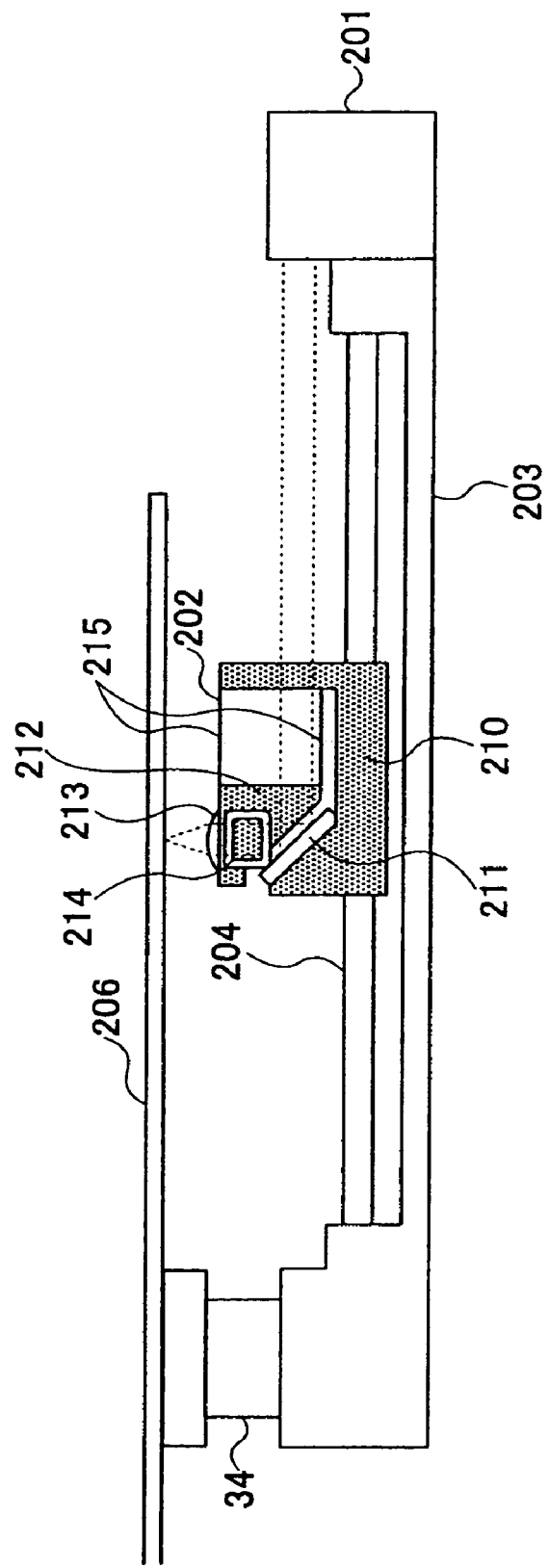
FIG. 2B is a diagram showing the concept of the separate optical system and the positional relationship between the fixed head and the movable head.
Figure 2C:
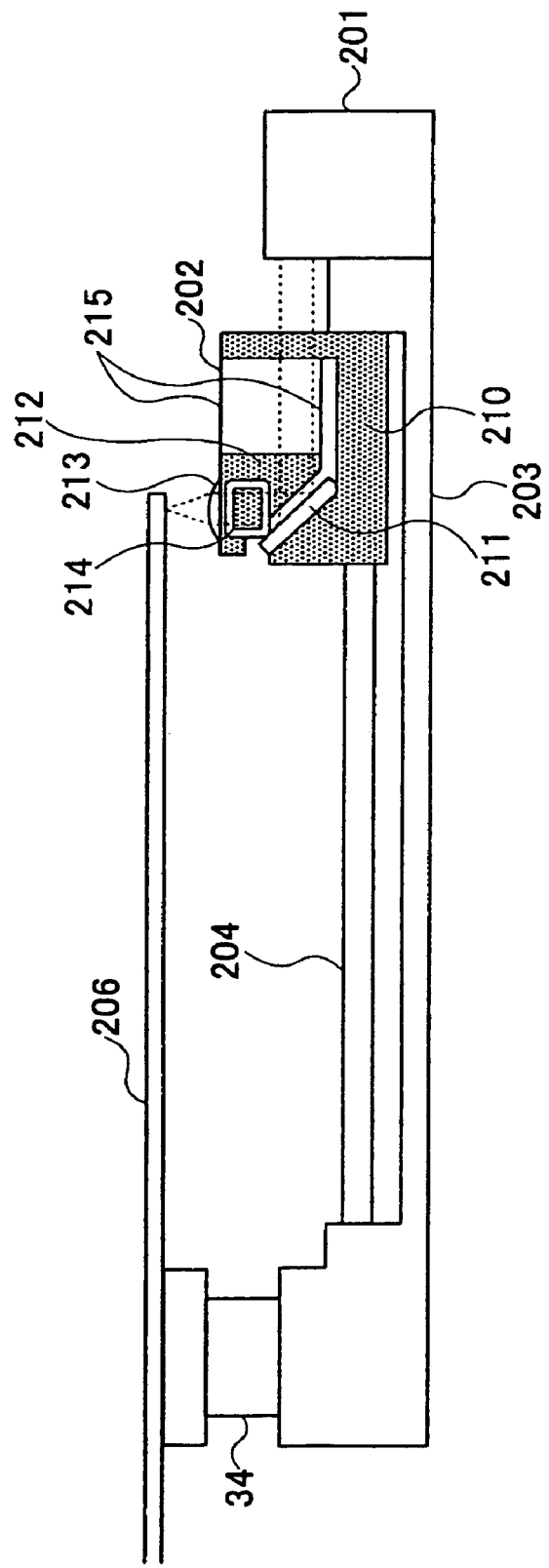
FIG. 2C is a diagram showing the concept of the separate optical system and the positional relationship between the fixed head and the movable head.
Figure 3:
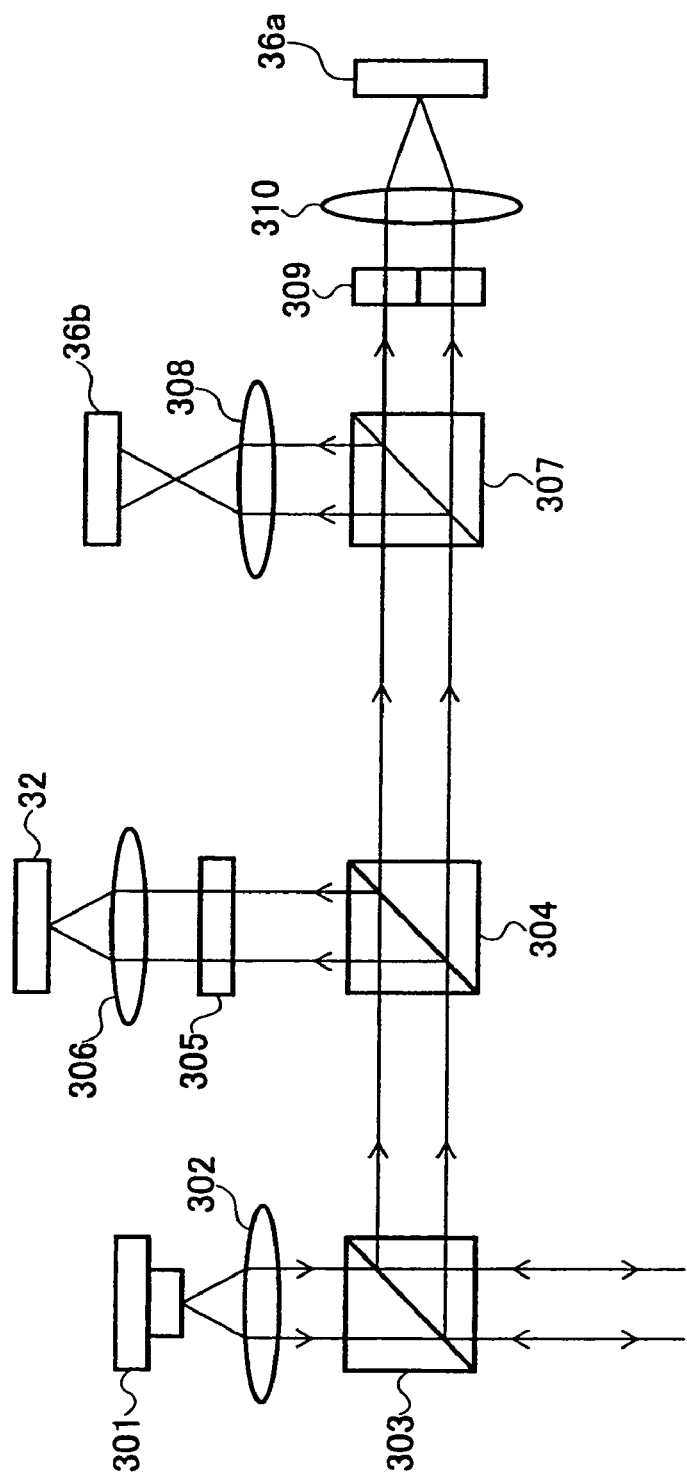
FIG. 3 is a diagram showing the structure of the fixed optical head.
Figure 4:
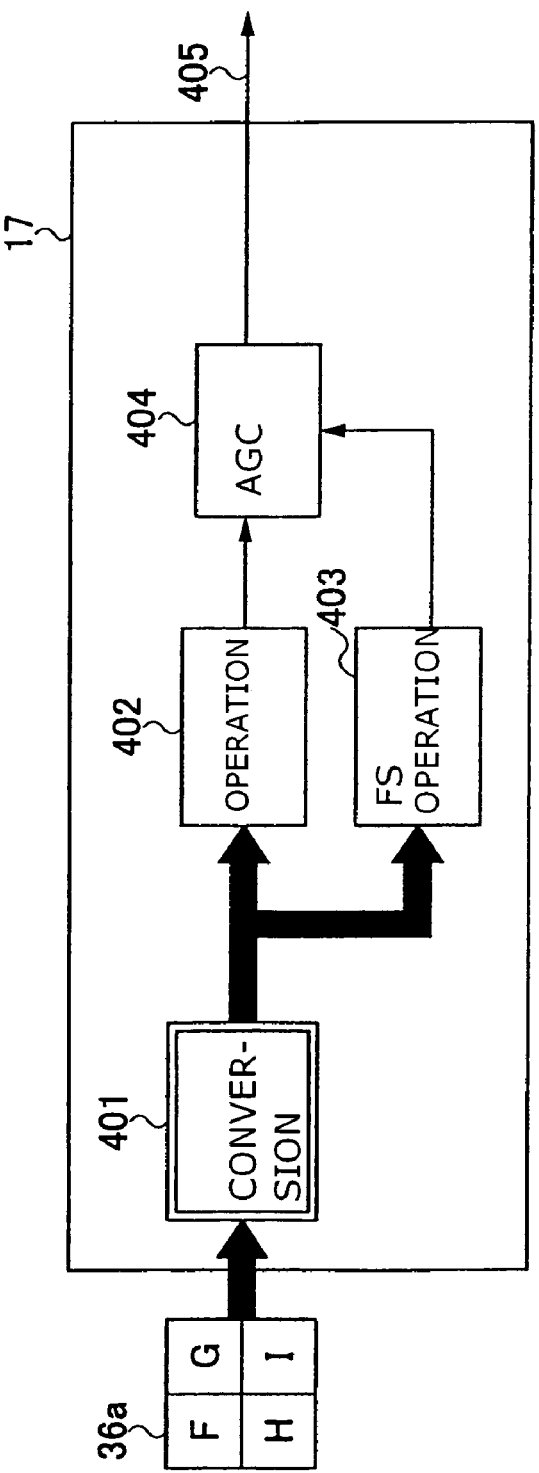
FIG. 4 is a block diagram of a first focus error signal detection circuit.
Figure 5:
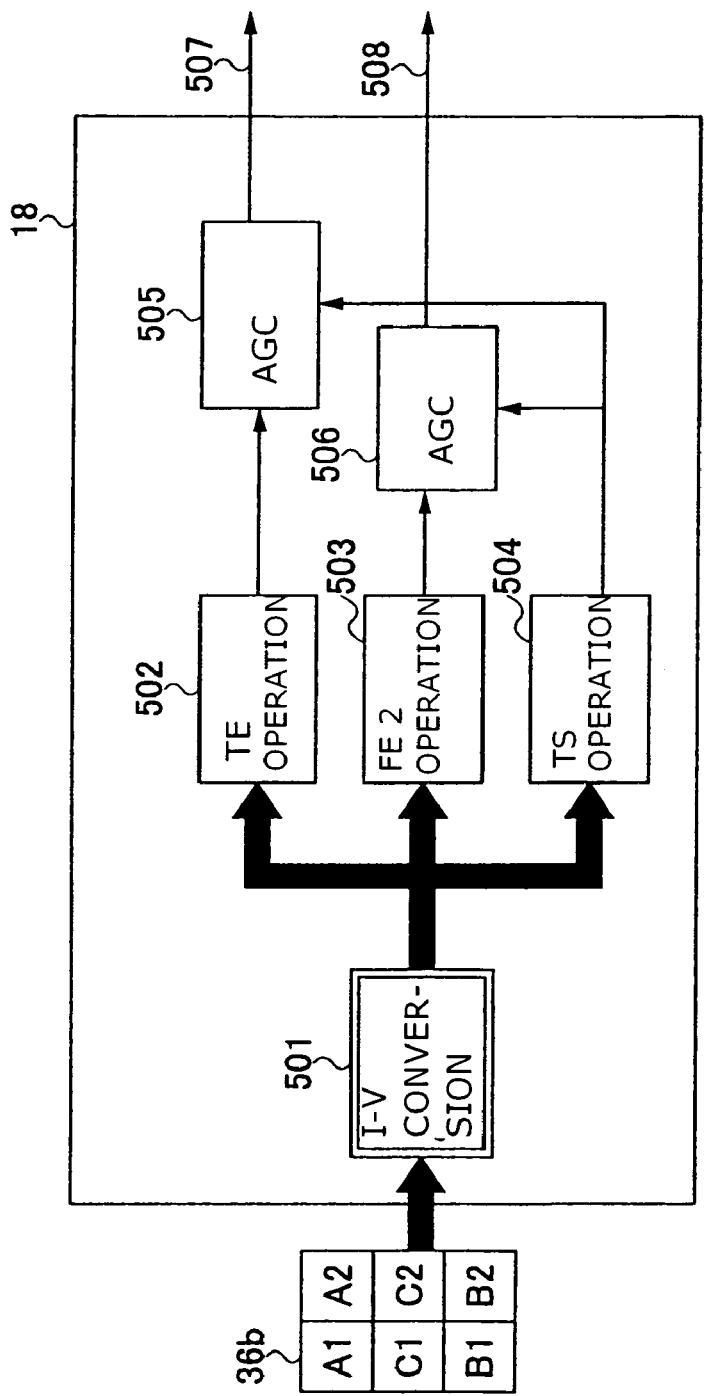
FIG. 5 is a block diagram of a track error signal and a second focus error signal detection circuit.
Figure 6A:
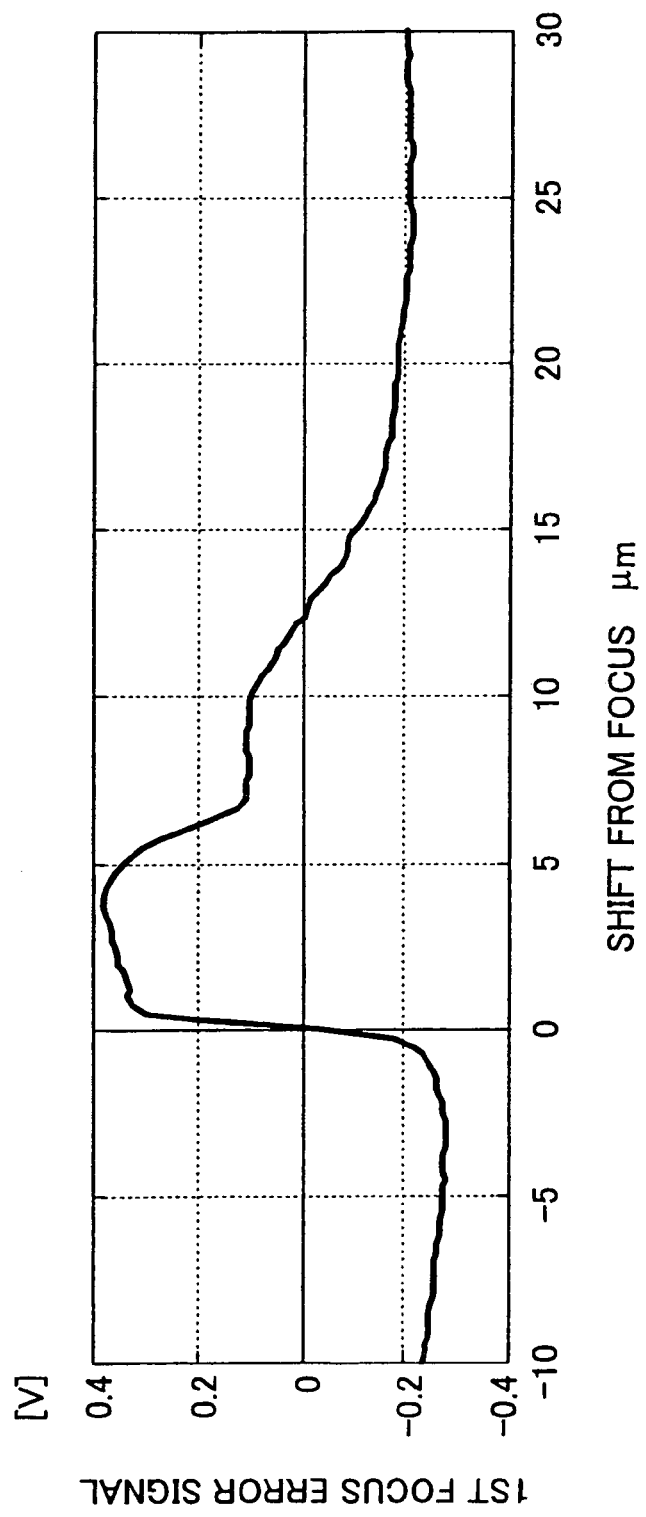
FIG. 6A is a graph showing an example of a first focus error signal.
Figure 6B:
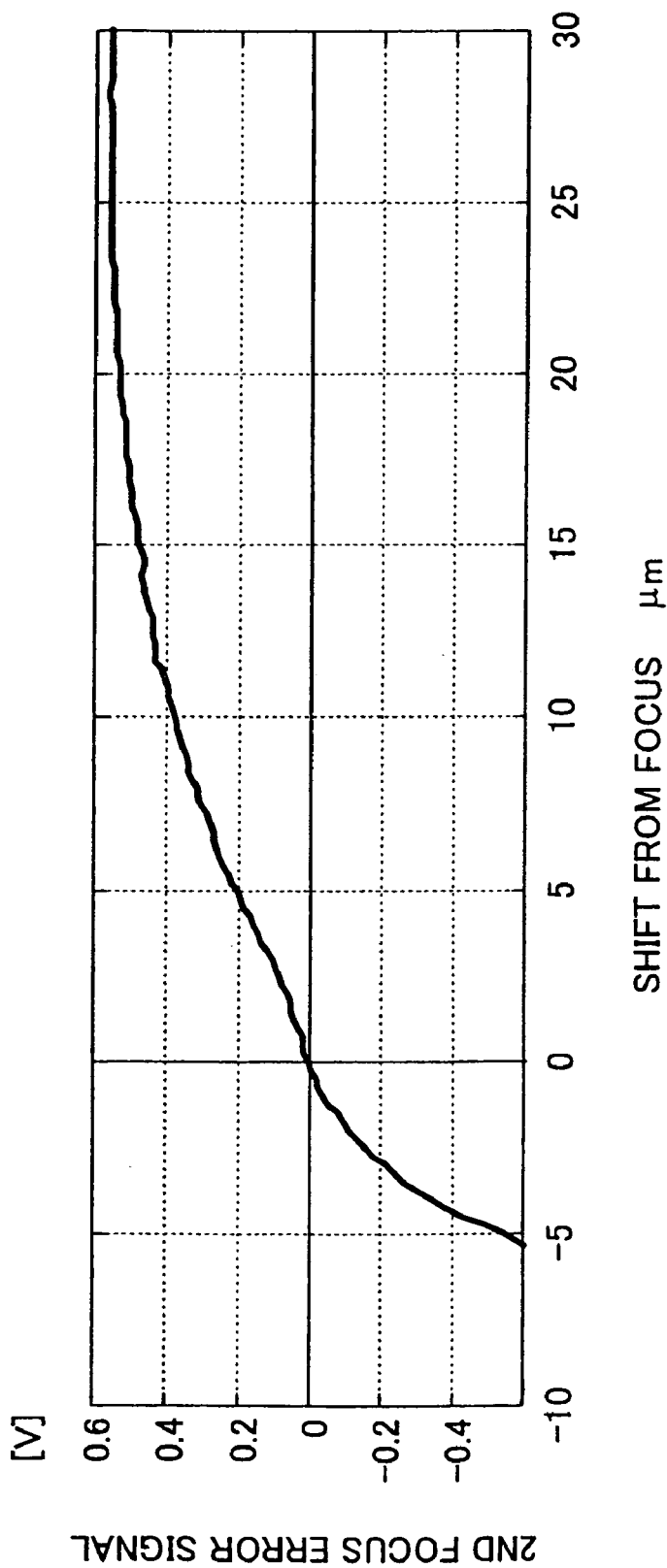
FIG. 6B is a graph showing an example of a second focus error signal.
Figure 7:
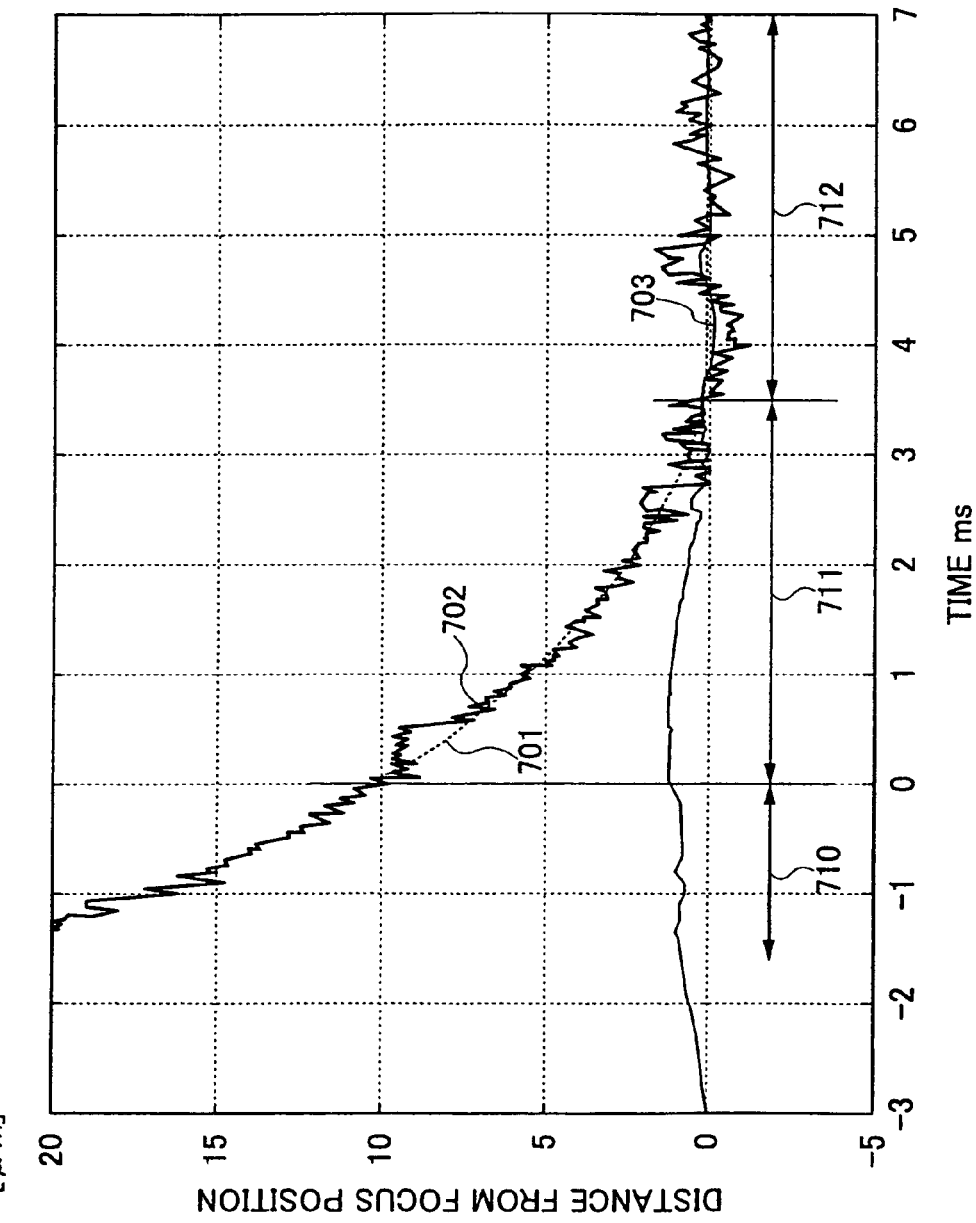
FIG. 7 is a graph showing a waveform of focus entry control using the second focus error signal.
Figure 8:
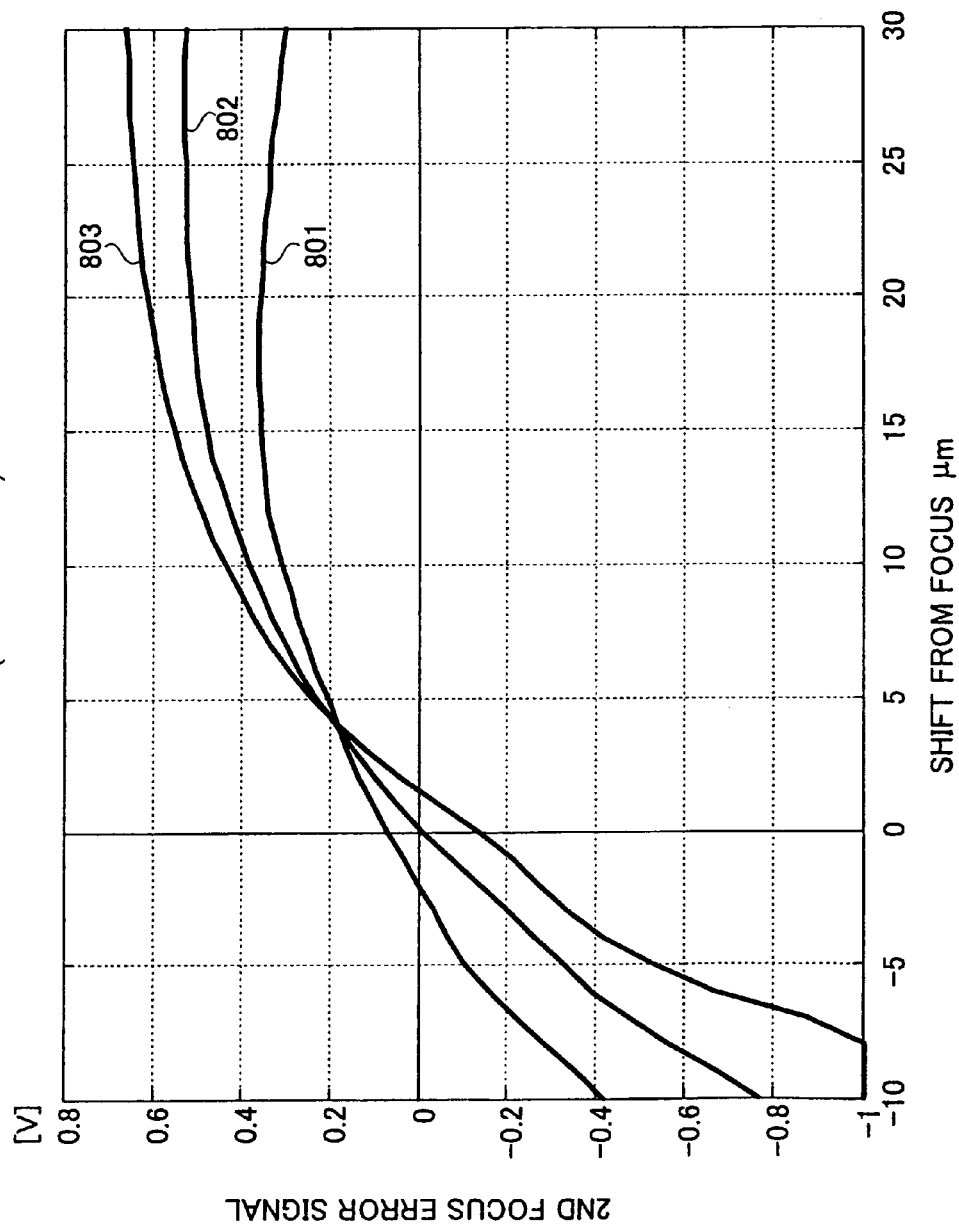
FIG. 8 is a graph showing an example of the second focus error signal.

When trajectory control is performed by using the second focus error signal 1021 at a constant rate of change, though actual approaching speed differs depending on the position of the movable head 202 shown in FIGS. 2A, 2B and 2C, it is possible to monitor the level of the first focus error signal 1024 and, at the zero-cross point thereof, perform a transition from focus servo control using the second focus error signal 1021 to focus servo control using the first focus error signal 1024. Hence, it can be seen that a smooth transient response is obtained.

The focus entry control part may also be realized by hardware, software executed by, for example, a microcomputer or a digital signal processing circuit (DSP), or a combination thereof.

In this embodiment, the description is given by taking the disk device as an optical device. However, the disk device is not a limitation and application to an optical storage device using another optical storage medium such as an optical card is also possible. Further, the present invention is not limited to optical storage devices using disks or optical cards, and may be applied to optical devices such as a microscope and a light emitting device.

As described above, according to the present invention, it is possible to positively cause the objective lens to approach in the vicinity of the focal point by performing target trajectory control with the use of the second focus servo control. Thereafter, the first focus servo signal is monitored, and focus servo control using the second focus servo signal is switched to focus servo control using the first focus servo signal. Accordingly, there is no error in the relative positions between the focus position and the position of the objective lens. Thus, it is possible to smoothly perform a transition to focus servo control using the first focus error signal within a predetermined error range for relative speed. Thereby, it is possible to stably and positively perform focus entry control.

Consequently, even in the case where the characteristics of the second focus error signal vary in accordance with a variation in the light path length of the separate optical system, it is possible to stably and positively perform focus entry control.

In addition, according to the present invention, since it is possible to stably and positively perform focus entry control, it is also possible to avoid collision of the objective lens with a disk.

The present invention is not limited to the specifically disclosed embodiments, and variations and modifications may be made without departing from the scope of the present invention.

What is claimed is:

1. An optical storage device comprising:
   a lens that is arranged to face a storage medium and serves to focus laser light on the storage medium;
   an actuator that changes a position of the lens;
   a first focus error signal detector that detects, within a first detection range, a difference between a focus position of the lens that focuses the laser light on the storage medium and the position of the lens;
   a second focus error signal detector that detects, within a second detection range that is wider than the first detection range, a difference between the focus position of the lens that focuses the laser light on the storage medium and the position of the lens;
   a first movement controller that causes the lens to approach the storage medium by using open-loop control by driving the actuator until the position of the lens falls within the second detection range of the second focus error signal detector from outside the second detection range of the second focus error signal detector;
   a target trajectory generator that generates a target trajectory signal for moving the lens;
   a second movement controller that causes the lens to approach the storage medium by using closed-loop control including a second focus error signal detected by the second focus error signal detector and the target trajectory signal to drive the actuator in a case where the position of the lens is within the second detection range of the second focus error signal detector; and
   a following controller that causes the position of the lens to follow the focus position of the lens with respect to the storage medium by using the closed-loop control by using a first focus error signal detected by the first focus error signal detector by driving the actuator in a case where the position of the lens is within the first detection range of the first focus error signal detector;
   wherein the second movement controller comprises a phase compensator that performs phase compensation on a difference signal between the target trajectory signal and the second focus error signal.

2. The optical storage device as claimed in claim 1, wherein the target trajectory generator generates the target trajectory signal that is continuously changed with respect to time and a rate of change of the target trajectory signal is of a single polarity.

3. The optical storage device as claimed in claim 1, wherein the target trajectory generator generates the target trajectory signal that is changed at a constant rate of change with respect to time.

4. An optical storage device comprising:
   a lens that is arranged to face a storage medium and serves to focus laser light on the storage medium;
   an actuator that changes a position of the lens;
   a first focus error signal detector that detects, within a first detection range, a difference between a focus position of the lens that focuses the laser light on the storage medium and the position of the lens;
   a second focus error signal detector that detects, within a second detection range that is wider than the first detection range, a difference between the focus position of the lens that focuses the laser light on the storage medium and the position of the lens;

a first comparator that is fed with a start signal, the second focus error signal, a first threshold value and a second threshold value, and outputs an output signal of a first predetermined level when, after the start signal is fed, a level of the second focus error signal is equal to or more than the first threshold value and the level of the second focus error signal is equal to or less than the second threshold value;

a second comparator that is fed with the output signal of the first comparator, the first focus error signal, a third threshold value and a fourth threshold value, and outputs an output signal of a second predetermined level when, after the output signal of the first comparator reaches the first predetermined level, a level of the first focus error signal is equal to or more than the third threshold value and the level of the first focus error signal is equal to or less than the fourth threshold value;

an approach control output generator that is fed with the start signal and the output signal of the second comparator, and generates an approach control output signal after the start signal is fed until the output signal of the second comparator reaches the second predetermined level;

a target trajectory generator that is fed with the output signal of the first comparator and the output signal of the second comparator, and outputs a target trajectory signal after the output signal of the first comparator reaches the first predetermined level until the output signal of the second comparator reaches the second predetermined level;

a subtractor that outputs a difference between the second focus error signal and the target trajectory signal;

a first phase compensator that is fed with the output signal of the first comparator and the output signal of the second comparator, and outputs a phase-compensated signal of an output signal of the subtractor after the output signal of the first comparator reaches the first predetermined level until the output signal of the second comparator reaches the second predetermined level;

a second phase compensator that is fed with the output signal of the second comparator and the first focus error signal, and outputs a phase-compensated signal of the first focus error signal after the output signal of the second comparator reaches the second predetermined level; and a focus actuator driving part that drives a focus actuator in accordance with the output signals of the approach control output generator, the first phase compensator and the second phase compensator.

5. An optical storage device comprising:

a lens that is arranged to face a storage medium and serves to focus laser light on the storage medium;

an actuator that changes a position of the lens;

a first focus error signal detector that detects, within a first detection range, a difference between a focus position of the lens that focuses the laser light on the storage medium and the position of the lens;

a second focus error signal detector that detects, within a second detection range that is wider than the first detection range, a difference between the focus position of the lens that focuses the laser light on the storage medium and the position of the lens;

a first comparator that is fed with a start signal, the second focus error signal and a first threshold value, and outputs an output signal of a first predetermined level when, after the start signal is fed, a level of the second focus error signal is equal to or more than the first threshold value;

a second comparator that is fed with the output signal of the first comparator, the second focus error signal and a second threshold value, and outputs an output signal of a second predetermined level when, after the output signal of the first comparator reaches the first predetermined level, the level of the second focus error signal is equal to or less than the second threshold value;

a third comparator that is fed with the output signal of the second comparator, the first focus error signal and a third threshold value, and outputs an output signal of a third predetermined level when, after the output signal of the second comparator reaches the second predetermined level, a level of the first focus error signal is equal to or more than the third threshold value;

a fourth comparator that is fed with the output signal of the third comparator, the first focus error signal and a fourth threshold value, and outputs an output signal of a fourth predetermined level when, after the output signal of the third comparator reaches the third predetermined level, the level of the first focus error signal is equal to or less than the fourth threshold value;

an approach control output generator that is fed with the start signal and the output signal of the second comparator, and generates an approach control output signal after the start signal is fed until the output signal of the second comparator reaches the second predetermined level;

a target trajectory generator that is fed with the output signal of the second comparator and the output signal of the fourth comparator, and outputs a target trajectory signal after the output signal of the second comparator reaches the second predetermined level and until the output signal of the fourth comparator reaches the fourth predetermined level;

a subtractor that outputs a difference between the second focus error signal and the target trajectory signal;

a first phase compensator that is fed with the output signal of the second comparator and the output signal of the fourth comparator, and outputs a phase-compensated signal of an output signal of the subtractor after the output signal of the second comparator reaches the second predetermined level and until the output signal of the fourth comparator reaches the fourth predetermined level;

a second phase compensator that is fed with the output signal of the fourth comparator and the first focus error signal, and outputs a phase-compensated signal of the first focus error signal after the output signal of the fourth comparator reaches the fourth predetermined level; and a focus actuator driving part that drives a focus actuator in accordance with the output signals of the approach control output generator, the first phase compensator and the second phase compensator.

6. A focus servo control method for an optical storage device including a lens that is arranged to face a storage medium and serves to focus laser light on the storage medium, and an actuator that changes a position of the lens, said method comprising:

a first focus error signal detecting step of detecting, within a first detection range, a difference between a focus position of the lens that focuses the laser light on the storage medium and the position of the lens;

a second focus error signal detecting step of detecting, within a second detection range that is wider than the first detection range, a difference between the focus position of the lens that focuses the laser light on the storage medium and the position of the lens;

a first movement controlling step of causing the lens to approach the storage medium by using open-loop control by driving the actuator until the position of the lens falls within the second detection range of the second focus error signal detector from outside the second detection range of the second focus error signal detector;

a target trajectory generating step of generating a target trajectory signal for moving the lens;

a second movement controlling step of causing the lens to approach the storage medium by using closed-loop control including a second focus error signal detected by the second focus error signal detecting step and the target trajectory signal to drive the actuator in a case where the position of the lens is within the second detection range of the second focus error signal detector; and a following controlling step of causing the position of the lens to follow the focus position of the lens with respect to the storage medium by using the closed-loop control by using a first focus error signal detected by the first focus error signal detecting step by driving the actuator in a case where the position of the lens is within the first detection range of the first focus error signal detector;

wherein the second movement controlling step comprises performing phase compensation on a difference signal between the target trajectory signal and the second focus error signal.

7. An optical device comprising:

a lens that serves to focus laser light on an object to be illuminated;

an actuator that changes a position of the lens;

a first focus error signal detector that detects, within a first detection range, a difference between a focus position of the lens that focuses the laser light on the object to be illuminated and the position of the lens;

a second focus error signal detector that detects, within a second detection range that is wider than the first detection range, a difference between the focus position of the lens that focuses the laser light on the object to be illuminated and the position of the lens;

a first movement controller that causes the lens to approach the object to be illuminated by using open-loop control by driving the actuator until the position of the lens falls within the second detection range of the second focus error signal detector from outside the second detection range of the second focus error signal detector;

a target trajectory generator that generates a target trajectory signal for moving the lens;

a second movement controller that causes the lens to approach the object to be illuminated by using closed-loop control including a second focus error signal detected by the second focus error signal detector and the target trajectory signal to drive the actuator in a case where the position of the lens is within the second detection range of the second focus error signal detector; and a following controller that causes the position of the lens to follow the focus position of the lens with respect to the object to be illuminated by using the closed-loop control by using a first focus error signal detected by the first focus error signal detector by driving the actuator in a case where the position of the lens is within the first detection range of the first focus error signal detector;

wherein the second movement controller comprises a phase compensator that performs phase compensation on a difference signal between the target trajectory signal and the second focus error signal.

8. The optical device as claimed in claim 7, wherein the target trajectory generator generates a target trajectory signal that is continuously changed with respect to time and a rate of change of the target trajectory signal is of a single polarity.

9. The optical device as claimed in claim 7, wherein the target trajectory generator generates a target trajectory signal that is changed at a constant rate of change with respect to time.

* * * * *